Patented Jan. 9, 1940

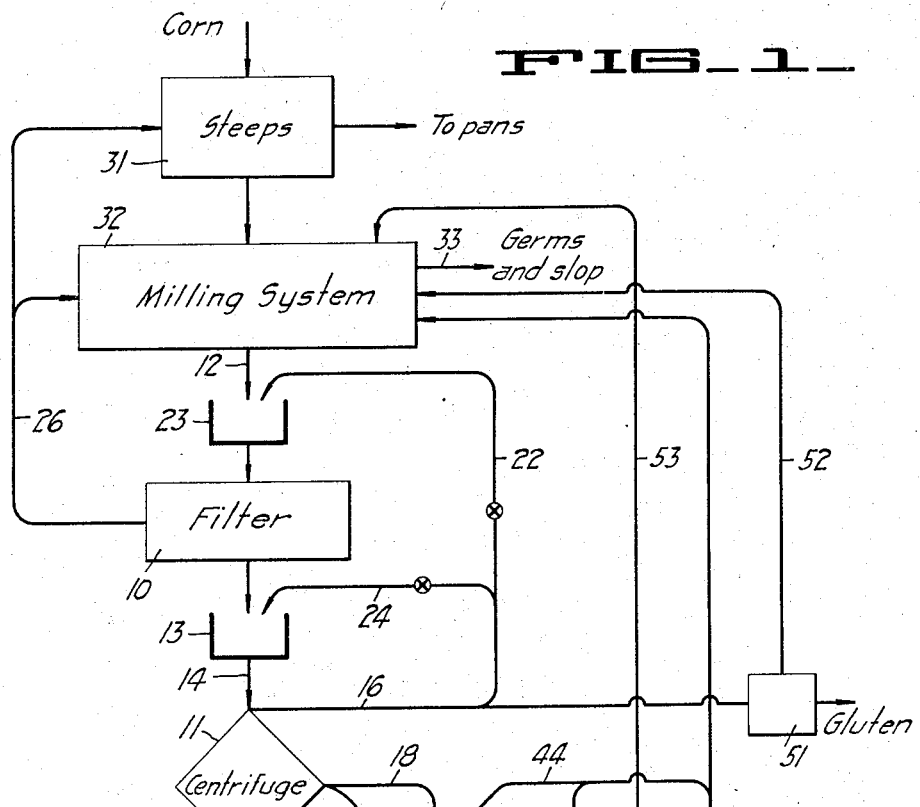
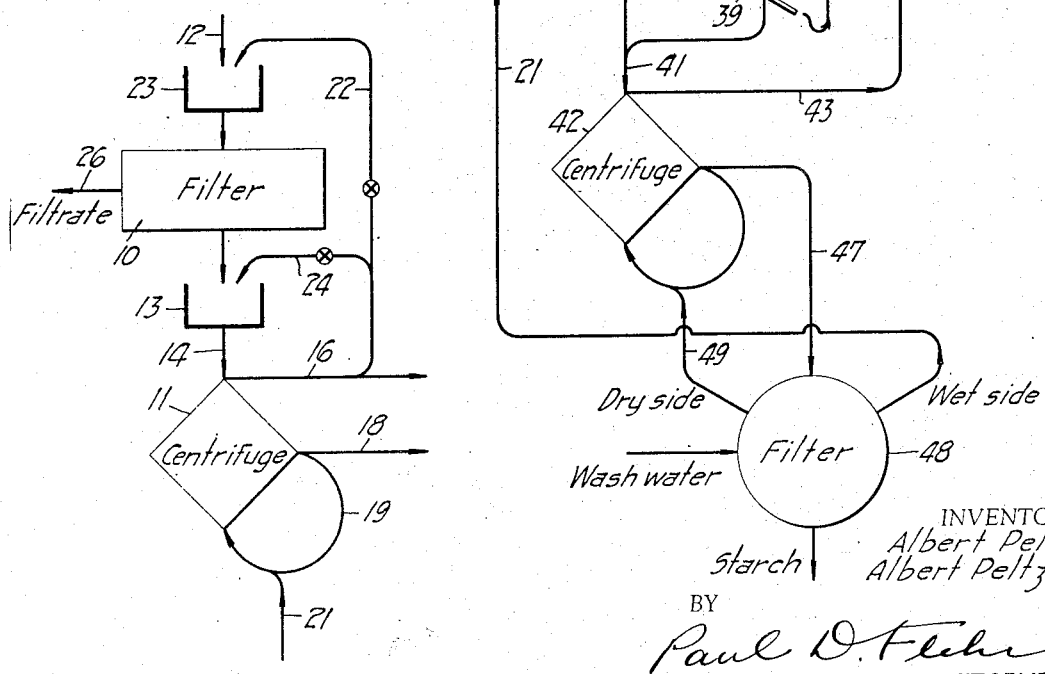

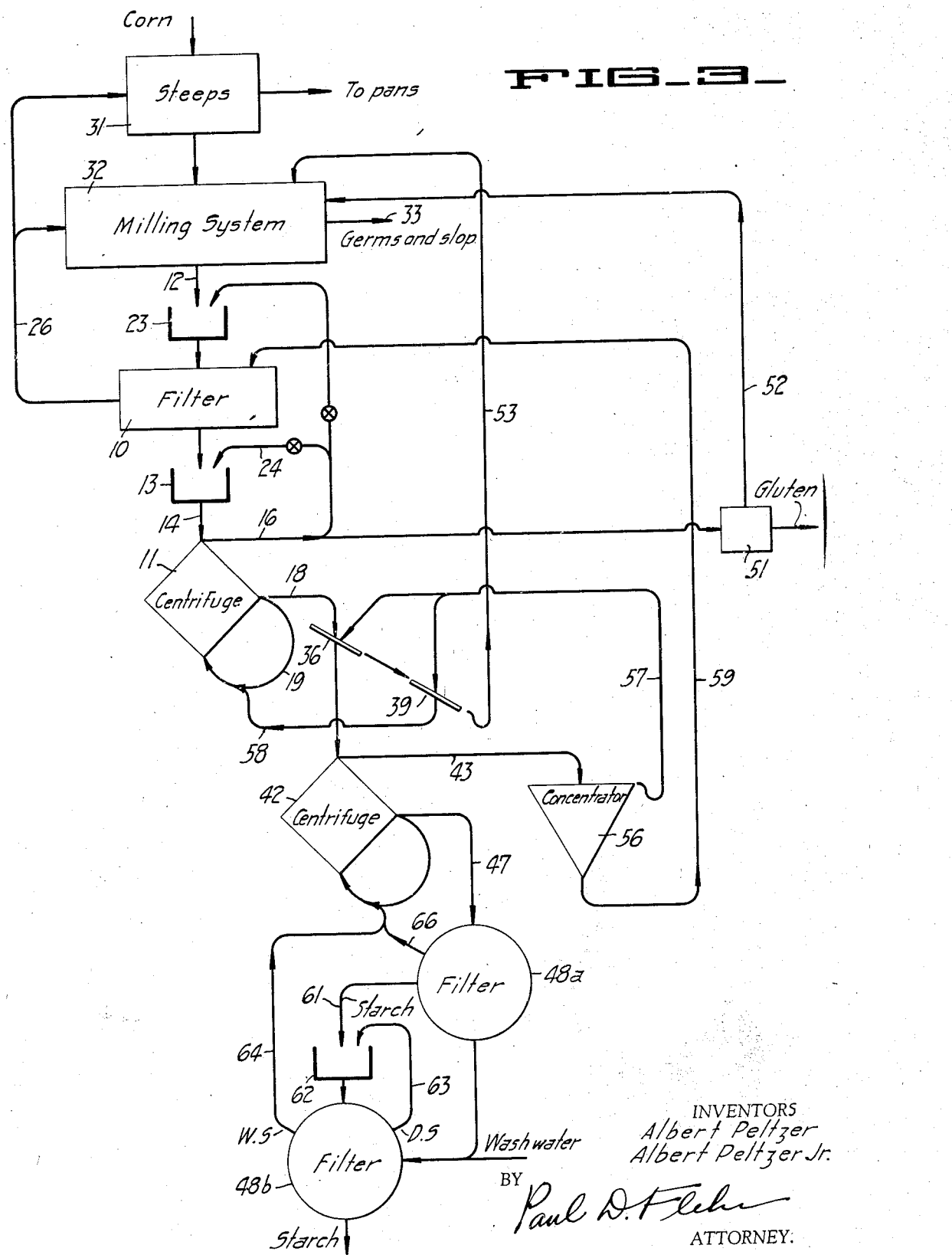

2,186,037

UNITED STATES PATENT OFFICE 2,186,037

PROCESS APPLICABLE TO STARCH MANUFACTURE

Albert Peltzer and Albert Peltzer, Jr., Palo Alto, Calif., assignors to Merco Centrifugal Separator Co. Ltd., San Francisco, Calif., a corporation of California Application February 20, 1935, Serial No. 7,378

6 Claims. (Cl. 127—68)

The invention relates generally to the art of effecting separating operations upon feed materials containing solid components, and applies more particularly to wet starch processes wherein a separation is effected between starch and gluten.

In general, it is an object of the invention to provide a novel method or process for effecting removal of a solid component, such as gluten, from starch-bearing substances or like feed materials, by the use of a minimum amount of water or carrier liquid.

More specifically as applied to the manufacture of starch, it is an object of the invention to make possible delivery of thickened gluten directly from the step of effecting primary separation between starch and gluten. The starch system disclosed herein is characterized by the fact that conventional gluten settlers or thickeners are omitted, which is made possible by the high gravity gluten obtained from the primary separating operation.

Further objects of the invention as applied to the manufacture of starch, are, to avoid the necessity of utilizing or disposing of gluten settler water, to minimize bacteriological action and resultant fouling, to effect a saving in the amount of fresh water employed, to avoid the necessity of evaporating excessive amounts of water, and to facilitate production of a starch of high quality and purity.

Further objects of the invention will appear from the following description in which the preferred embodiment of the invention has been set forth in detail in conjunction with the accompanying drawings.

The invention disclosed herein may be deemed an improvement of subject-matter disclosed and claimed in co-pending application Serial No. 731,415, filed June 20, 1934. Likewise, certain subject-matter disclosed but not claimed herein has been disclosed and claimed in co-pending application Serial No. 743,528, filed September 11, 1934, and Serial No. 743,529, filed September 11, 1934.

Referring to the drawings:

Fig. 1 is a flow sheet indicating a process for the manufacture of corn starch, utilizing the present invention.

Fig. 2 is a simplified flow sheet showing certain steps incorporated in the process of Fig. 1.

Fig. 3 is a flow sheet indicating a modified process for the manufacture of corn starch, utilizing the present invention.

The complete process for the manufacture of starch from Indian corn and like starch-bearing materials, represented by Fig. 1, can best be described after a description of the steps represented by Fig. 2. It will be presumed that mill starch is being treated, such as is commonly produced in wet starch manufacturing processes, and which is generally subjected to tabling operations for separation of starch from gluten. In such a feed material the starch and the gluten are solid components of different classifying characteristics, suspended in water as a carrier liquid, and the presence of starch facilitates filtration.

Two principal pieces of equipment are indicated in Fig. 2, namely, a filter 10 and a centrifuge 11. The filter is preferably one of the continuous type, capable of operation upon mill starch, to continuously produce a dewatered starch-gluten cake. The centrifuge is likewise preferably capable of continuous operation, with characteristics such as will enable a relatively sharp separation between starch and gluten. A centrifuge of the type disclosed in United States Letters Patent No. 1,923,454 and No. 1,945,786, in which there is continuous flushing out of heavier solids from the rotor, has been found desirable.

Line 12 represents a supply of mill starch to the filter 10. The dewatered filter cake resulting from the filtering operation is subjected to re-pulping, as indicated at 13, to form the feed 14 to the centrifuge 11. By virtue of separation effected in the centrifuge, gluten passes out mainly in the overflow 16, while separated starch passes out in the underflow 18. In accordance with the disclosures of the aforesaid patents, a part of the underflow 18 is shown being continuously returned to the centrifuge rotor, as indicated at 19, and in addition thereto the return circuit is shown being supplied with wash water 21.

In order to effect removal of the gluten overflow 16 at a relatively high gravity, the filter 10 is utilized to effect dewatering of a part of the gluten overflow, at the same time that it is dewatering the mill starch 12, and in addition thereto another part of the gluten overflow is utilized as a liquid medium for the repulping operation 13. Thus, line 21 represents diversion of a part of the gluten overflow for introduction ahead of the filter 10, the introduction being conveniently represented by the mixing container 23, where the returned gluten overflow is intermixed with the mill starch stream. Diversion of the other part of the gluten overflow for the repulping operation is indicated by line 24. Removal of filtrate from the filter 10, which represents liquid extracted both from the mill starch stream and from the gluten overflow return 22, is indicated at 26.

Operation of the process represented by Fig. 2 can now be reviewed as follows:—The feed to the continuous filter 10 consists of both mill starch and a part of the gluten overflow from centrifuge 11. The filter cake, by virtue of the repulping operation 13, is repulped to form a feed of sufficient fluidity for introduction into the centrifuge 11. Because of the amount of water removed as filtrate from the filter 10 (that is, from both the mill starch and the return gluten overflow), and because of the use of gluten overflow to supply water for the repulping operation 13, the gluten overflow is caused to be of relatively high gravity, so that if desired it can be further dewatered without the necessity of utilizing conventional gravity gluten settlers. Return of gluten overflow to the filter 10 increases the load upon this piece of equipment, to an extent corresponding to the amount of gluten overflow returned, but does not seriously interfere with the filtering operation, due to the relatively large proportion of starch particles in the mill starch stream. Likewise, return of gluten overflow both to the filter 10 and for the repulping operation 13, does not appear to seriously interfere with proper separation between starch and gluten in the centrifuge 11.

Theoretically it is possible to divert such an amount of gluten overflow to the head of filter 10 that the overflow would be too thick for proper discharge. This can be taken into account to make possible more efficient centrifugal separation, without sacrificing thickening of the overflow to the utmost practical degree. Thus, the rate of introduction of wash water 21 can be adjusted to such a value that a substantial part of this wash, in addition to that part which carries out solids in the underflow 18, flows countercurrently through the zone of separation to be discharged with the overflow 16. Dilution of the overflow beyond the gravity limits desired is then offset by increasing the amount of overflow returned to the filter 10. Such a countercurrent or up-flow of wash affords better separation by displacement, and when carried out in the manner described there is in effect no accompanying lowering in gravity of the underflow, such as would ordinarily result.

The complete wet starch manufacturing process of Fig. 1 can now be described as follows:— Suitable starch-bearing material, such as Indian corn, is treated in the steeps 31, and the steeped material is then supplied to the milling system 32. This milling system may conform to conventional practice, except that, for reasons to be presently explained, silk reels from the germ system, and also silk screens from the slop system, may be omitted. Line 12 (corresponding to line 12 of Fig. 2) represents removal of germs and slop. Assuming the omission of silk from the milling system as previously mentioned, the mill starch stream contains some grits which would otherwise have been removed by silk in the germ system, and also contains fine fiber which in conventional practice would be removed by silk in a fine slop system.

The filtrate 26 from the filter 10 may be utilized in preceding operations, as for example in the steeps and in the milling system, as indicated. As disclosed in co-pending application Serial No. 743,528, the centrifuge 11 serves not only to effect a separation between starch and gluten, but also to effect a classification of fine slop from the mill starch stream. Thus, slop of a filamentary nature, and also slimes which may be present, pass out in the gluten overflow 16, while the remainder of the slop, together with grits from the mill starch stream, passes out in the starch underflow 18.

To provide proper treatment following primary separation in centrifuge 11, the underflow 18 is shown being subjected to silk screening 36, with the tailings from this screening operation being subjected to grinding, as indicated at 37, and again subjected to silk screening at 39. The starch passing through the silk screens is shown being merged to form a starch feed 41 for a second centrifuge 42. The centrifuge 42 may be similar to centrifuge 11, and the overflow 43 from the same, which is relatively clear compared with the overflow 16 from centrifuge 11, may be used in part as a wash in the milling system 32, and in part as a wash for the silk screening operations 36 and 39, as indicated by branch lines 44 and 46. The starch underflow 47 from the centrifuge 42 is shown being further subjected to purification by washing, in a suitable starch filter system 48. The dry side filtrate 49 from the filter system 48 is shown being utilized as a wash liquor in centrifuge 42, while the wet side filtrate is shown forming the wash liquor 21 for the centrifuge 11.

As has been previously pointed out, the gluten overflow 16 from centrifuge 11 is thickened to such an extent that it may be delievered directly to a filter 51 or like dewatering means, without the use of conventional gluten settlers. Water removed from the gluten overflow 16 in the dewatering means 51 can be returned to preceding operations, as for example to the milling system 32, as indicated by line 52. Tailings from the silk screening operation 39, which include the fine slop removed by silk screening after primary separation between starch and gluten in the centrifuge 11, may be delivered to a slop expeller or like means, as indicated by line 53.

Operation of the process of Fig. 1 can be briefly reviewed as follows:—The mill starch stream from the milling system 32 is subjected to continuous filtration at 10, together with a part of the gluten overflow which is continuously diverted from the centrifuge 11. Filter cake from this filtering operation is continuously repulped with a part of the gluten overflow, and is then supplied as a feed to the centrifuge 11. Slop remaining in the starch underflow 18 is removed in the screening operations 36 and 39, and grits tailing off from the screening operation 36 are ground, so that a considerable part of the starch from the same passes through the silk in the screening operation 39. The screened starch is subjected to further centrifugal treatment in the centrifuge 42, and the starch underflow 47 from the same is then subjected to further purification in the filter system 48. The thickened gluten overflow 16 from centrifuge 11 is shown being delivered to the dewatering means 51, without the use of gluten settlers, for the recovery of gluten cake. With such a process, water in the steeping operation 31 can be reduced to a substantial degree compared with conventional practice, thus reducing water withdrawn to the evaporating pans. The water requirements for the milling system 32 are likewise materially reduced over conventional practice, due to the omission of silk screening, thereby enabling production of a relatively high gravity mill starch stream.

As set forth in the aforesaid co-pending application Serial No. 743,528, silk screening upon the underflow 18 after centrifugal treatment is materially simplified as compared with conventional silk screening in the milling system before tabling, because of the absence of filamentary material to disrupt or clog the silk screens or reels, and because of the corresponding lessened requirements for wash liquor. The rapid thickening of gluten, as compared to the long settling periods required for conventional gluten thickeners, minimizes bacteriological action and fouling of the system.

To cite an example of results which can be obtained by the use of the present process, the overflow from centrifuge 11 may contain from 15 to 20 ounces of gluten per gallon, as compared with 2 to 3 ounces per gallon in the tailings from light gravity tabling, and 4 to 5 ounces per gallon from so-called heavy gravity tabling. Such a thickened gluten overflow can immediately be filtered, without interposing the step of effecting further thickening by gravity settling.

The process represented by Fig. 3 makes possible better water balance with further water economy. This process is characterized by the use of a concentrator or like means for clarifying the overflow from the second centrifuge 42, and also by the fact that a substantial portion of the overflow from the second centrifuge is utilized as wash in the first centrifuge 11. Thus, the overflow 43 from centrifuge 42 is shown being delivered to a concentrator 56, which may be of the gravity type. The clarified overflow 57 from this concentrator is shown being used as a wash upon screens 36 and 39, with the starch and liquid passing through the screen 39 forming the wash 58 for centrifuge 11. The underflow 59 from the concentrator 56, which contains the major part of the gluten from overflow 43, is shown being returned to the filter 10, where it can serve as a dry side wash or may be blended with the mill starch stream.

As representative of the starch filtering system corresponding to the system 48 of Fig. 1, two starch filters 48a and 48b are shown. Starch 61 removed from filter 48a is repulped as indicated at 62 and delivered to the second filter 48b. Line 63 indicates use of dry side filtrate from filter 48b, for the repulping operation 62. Line 64 indicates use of wet side filtrate from filter 48b, as a wash for centrifuge 42. This wash can be supplemented by filtrate from filter 48a, as indicated by line 66. Fresh wash water is introduced into both of the starch filters, and the washed starch is removed from the filter 48b.

With the process just described, a better water balance can be maintained, and the water for the steeping operation can be reduced to a minimum consistent with proper steeping action. No detrimental bacteriological action occurs by virtue of the concentrator 56, since the period of treatment required to effect proper clarification is relatively short compared with treatment of table tailings in conventional gravity settlers, this being due to the fact that the overflow 43 has a low concentration of solids and is readily amenable to clarification. The use of clarified overflow from the second centrifuge as wash water in the first centrifuge makes possible more efficient centrifugal separation, with the removal of an underflow containing a lower percentage of protein. Consequently, the starch underflow from the second centrifuge 42 is relatively free of protein, so that treatment in the starch filtering system is simplified and a higher quality starch can be produced by the process as a whole. From what has been explained it necessarily follows that use of clarified overflow from the second centrifuge as wash for the first centrifuge 11, also makes it possible for the action of this centrifuge to more effectively block solubles from the subsequent part of the process, to thereby facilitate silk screening and subsequent treatment.

We claim:

1. In a wet starch manufacturing process, where corn or like starch-bearing material is subjected to steeping and milling operations to produce a mill starch containing starch and gluten, the improvement consisting in subjecting the mill starch to a dewatering operation, pulping the dewatered material with a liquid medium, subjecting the pulped material to a separating operation whereby gluten is removed in an overflow and starch in an underflow, and bending a part of the gluten overflow with the mill starch, whereby said dewatering operation serves simultaneously to dewater the mill starch and also to dewater that part of the gluten overflow blended with the same.

2. In a wet starch manufacturing process, where corn or like starch-bearing material is subjected to steeping and milling operations to produce a mill starch containing starch and gluten, the improvement comprising subjecting the mill starch to a dewatering operation, pulping the dewatered material with a liquid medium, subjecting the pulped material to a separating operation whereby gluten is removed in an overflow and starch in an underflow, and maintaining the gluten overflow in a thickened condition by blending the mill starch being supplied to said dewatering operation with a part of the gluten overflow, and by utilizing another part of the gluten overflow as said liquid medium.

3. In a wet starch manufacturing process, where corn or like starch-bearing material is subjected to steeping and milling operations to produce a mill starch containing starch and gluten, the improvement consisting in subjecting the mill starch to a dewatering operation, subjecting the dewatered material to centrifugal separation whereby gluten is removed in an overflow and starch in an underflow, continually blending the mill starch with a part of the gluten overflow, and continually mixing another part of the gluten overflow with the dewatered material for supplying the last-mentioned centrifugal separating operation.

4. In a method of treating liquid feed materials containing lighter and heavier solid components, the steps of effecting removal of carrier liquid from the feed material to form substantially a caked mass, pulping the caked mass with a liquid medium, subjecting the pulped material to centrifugal separation whereby lighter components are removed in an overflow and heavier components are removed in an underflow, introducing a part of said overflow back to said first step, whereby carrier liquid is removed from the same simultaneously with removal of carrier liquid from the feed material, and utilizing another part of said overflow as said liquid pulping medium.

5. In a wet starch manufacturing process, where corn or like starch-bearing material is subjected to steeping and milling operations to produce a mill starch containing starch and gluten, the improvement consisting in subjecting the mill starch to a dewatering operation, subjecting the dewatered material to centrifugal separation whereby gluten is removed in an overflow and starch in an underflow, continually mixing a part of the gluten overflow with the dewatered material for supplying the last-mentioned centrifugal separating operation, supplying wash liquor to the centrifugal separating operation at such a rate that a part of said wash is delivered in the gluten overflow, and avoiding dilution of said overflow by returning another part of the same back to the dewatering operation.

6. In a wet starch manufacturing process, where corn or like starch bearing material is subjected to steeping and milling operations to produce a mill starch containing starch and gluten, the improvement comprising subjecting the mill starch to a filtering operation to form a filter cake, pulping the filter cake with a liquid medium, subjecting the pulped material to a centrifugal separating operation whereby gluten is removed in an overflow and starch in an underflow, and maintaining the gluten overflow in a thickened condition by blending the mill starch being supplied to said dewatering operation with a part of the gluten overflow, and by utilizing another part of the gluten overflow as said liquid medium, the percentage of gluten solids maintained in the gluten overflow being many times greater than the percentage of gluten solids contained in gluten tailings from conventional light gravity tabling of mill starch.

ALBERT PELTZER.
ALBERT PELTZER, Jr.